B. BORDEN.
THREAD CUTTING TOOL.
APPLICATION FILED DEC. 23, 1909.

1,033,983.

Patented July 30, 1912.

2 SHEETS—SHEET 1.

Witnesses
W. A. Williams
Francis P. Maguire

Inventor
Bradford Borden
By
Attorney

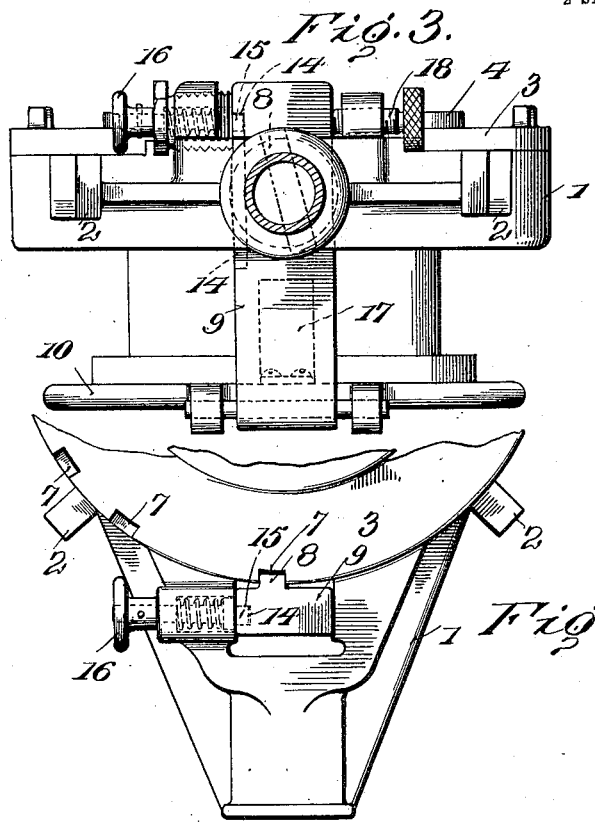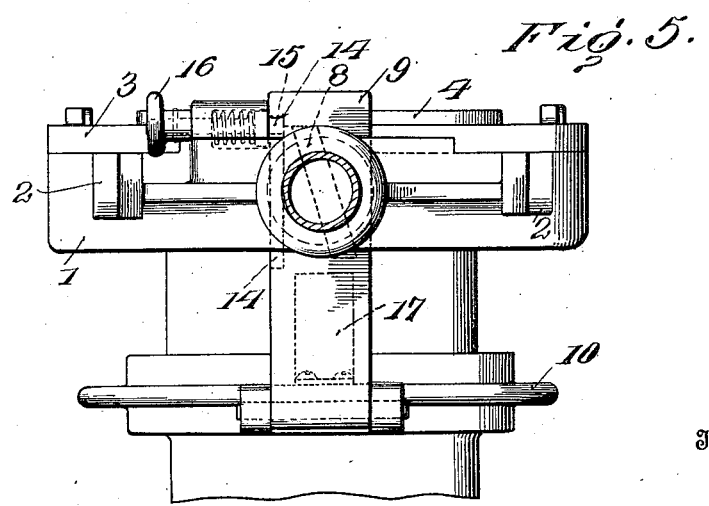

UNITED STATES PATENT OFFICE.

BRADFORD BORDEN, OF TORONTO, ONTARIO, CANADA, ASSIGNOR TO THE BORDEN COMPANY, OF WARREN, OHIO, A CORPORATION OF OHIO.

THREAD-CUTTING TOOL.

1,033,983.  Specification of Letters Patent.  Patented July 30, 1912.

Application filed December 23, 1909. Serial No. 534,656.

*To all whom it may concern:*

Be it known that I, BRADFORD BORDEN, of Toronto, in the Province of Ontario, Dominion of Canada, have invented certain new and useful Improvements in Thread-Cutting Tools; and I do hereby declare the following to be a full, clear, and exact description of the invention, such as will enable others skilled in the art to which it appertains to make and use the same.

The primary object of this invention is to provide in a pipe threading tool for cutting tapered threads improved means for permitting the chasers to be readily adjusted to accommodate pipes of different sizes; and also for undercutting or overcutting to accord with variations from standard dimensions.

The invention will be hereinafter fully set forth and particularly pointed out in the claims.

Figure 1:
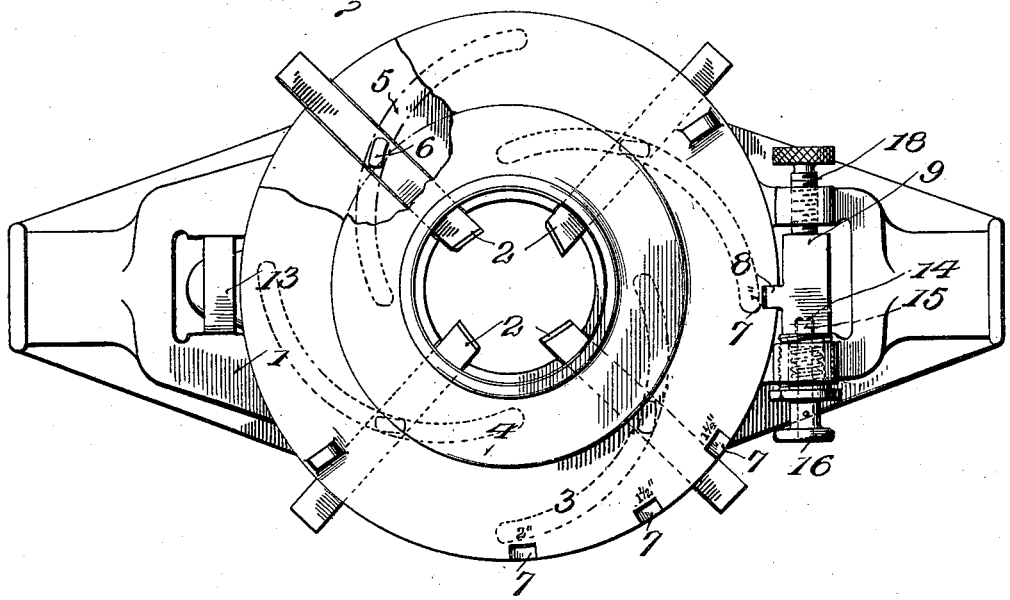
Figure 2:
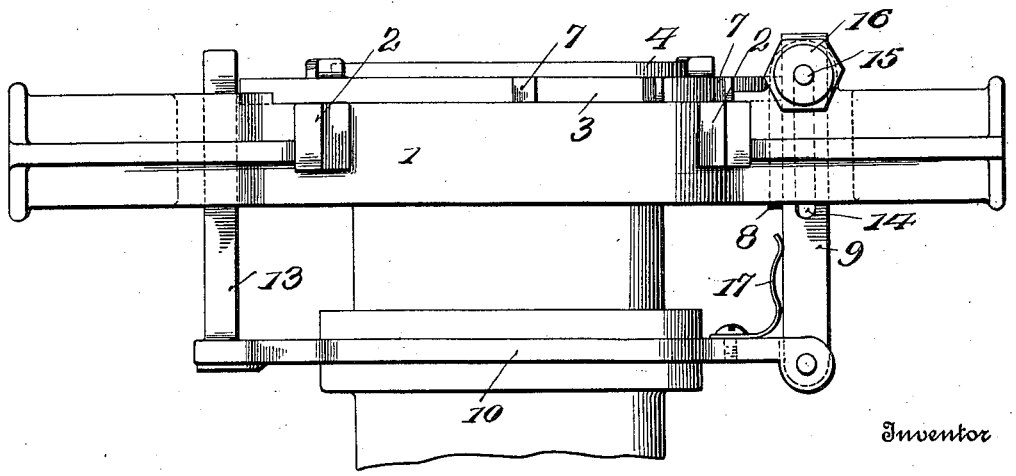

In the accompanying drawings, Figure 1 is an end elevation. Fig. 2 is a side view. Fig. 3 is a view similar to Fig. 2 but at right angles thereto. Fig. 4 is a fragmentary plan view showing a slight modification. Fig. 5 is an end view of Fig. 4.

Referring to the drawings, 1 designates the housing or chaser carrier; 2 a series of radially arranged chasers; and 3 a rotary cam plate mounted on the chaser-carrier whereon it is held by a nut 4 screwed on a central tubular extension of the chaser-carrier. The cam plate has on its inner face a series of eccentric grooves 5 for receiving lugs 6 of the several chasers, and on its periphery it has a series of cut-outs or recesses 7 in any one of which is designed to fit a lug 8 which extends diagonally across the face of a post 9. The number of cut-outs 7 is regulated by the capacity of the tool. The post 9 is projected through an opening in the chaser-carrier and mounted at its rear end on a ring 10 which is rotatably fitted on a work-holder by which the threading tool is centered on the pipe to be threaded. For the purpose of holding the parts in proper alinement, and secure uniformity of movement, a second post 13 carried by ring 10 is projected through an opening in the housing on a line diametrically opposite post 9. As the threading operation progresses the chaser-carrier travels toward the work-holder, but while the posts revolve with the chaser-carrier they do not partake of its longitudinal movement, and in consequence the engagement between the cam plate and the diagonal lug 8 of post 9 controls the rotation of the cam plate independently of its rotation with the chaser-carrier, whereby the chasers uniformly recede to cut a tapered thread.

To enable the cam plate to be turned to set the chasers for pipes of different sizes, post 9 may be readily disengaged from such plate. For this purpose the post is hinged to ring 10 and is provided in one of its sides with a longitudinal groove 14 into which projects the end of a spring-impelled stud 15 mounted in the chaser-carrier but capable of being readily disengaged from the post by a pull on its head 16. When the stud is thus disengaged, the post is moved laterally to withdraw its lug 8 from engagement with the cam plate. This is accomplished automatically by a spring 17 mounted on ring 10 and bearing against the inner face of the post. After the chasers have been properly set by the rotation of the cam plate the post is returned to its normal position, and its lug will project into the alined cut-out of the cam plate, and the stud 15 will again hold the post in position.

To allow of variations from standard, that is to say, for undercutting or overcutting, I provide an adjusting screw 18 which is mounted in the housing on a line opposite the stud 15 so that by tightening or loosening this screw a relative adjustment may be effected between the cam plate and the chaser-carrier. For this purpose the post 9 is capable of being moved longitudinally of the axis of its pivot, space being provided for that purpose as clearly shown in Fig. 3.

While it is advantageous to construct the tool after the manner described in order that threads may be cut to allow for variations from standard sizes, yet such feature may be omitted, and in that event the post 9 will fit against the opposite walls of the opening in the chaser-carrier, as shown in Figs. 4 and 5.

The operation of the tool will be readily apparent to those skilled in the art. To adjust the chasers the spring-impelled stud 15 is withdrawn from engagement with post 9 and the latter is immediately disengaged from the cam plate by spring 17. Thereupon the cam plate is turned axially to effect the necessary adjustment, and when this is accomplished post 9 is restored to its normal position and its lug will enter the alined cut-out of the cam plate. As the cutting operation progresses the independent rotation of the cam plate while revolving with the chaser-carrier will be controlled by the engagement with the inclined lug of the post, and thereby the automatic uniform recession of all of the chasers will be effected.

Under some circumstances the rotation of the cam plate may be caused wholly by reason of its engagement with the diagonal lug of the post, while under other conditions, as when the pressure of the pipe against the chasers is in itself sufficient to effect the axial rotation of such plate, independently of its rotation with the chaser-carrier, then such independent rotation while permitted is controlled by the engagement between the cam plate and the post. Hence the tool is positive in operation and certain in results.

I claim as my invention:—

1. In a tool for cutting tapered threads, the combination with a rotatable and longitudinally movable chaser-carrier, a series of radially-arranged chasers, and a chaser-engaging plate rotatable with, and also relatively to, the chaser-carrier, of a post rotatable with said chaser-carrier but not partaking of the longitudinal travel thereof, such post engaging said plate for controlling the independent rotation thereof, a support for said post for permitting it to be moved laterally to free said plate and means for detachably retaining the post in engagement with said plate.

2. The combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, such post engaging directly with said plate for controlling the rotation thereof independently of the chaser-carrier, means for detachably retaining the post in engagement with said plate, and means for automatically disengaging the post from the plate when the post is freed from said retaining means.

3. The combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, such post having a diagonal guideway with which said plate is designed to engage at any one of a plurality of points, and means for detachably holding the post to permit the plate, when the post is freed of said latter means, to be moved to adjust the chasers.

4. The combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, such post having a diagonal guideway with which said plate is designed to engage at any one of a plurality of points, means for detachably holding the post to permit the plate, when the post is freed of said latter means, to be moved to adjust the chasers, and means for automatically disengaging the post from said plate when the post is freed of said holding means.

5. The combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, such post having a diagonally-arranged lug, said plate having in its periphery a series of grooves for severally receiving said lug, means for holding said post in its normal position relatively to said plate, and means for disengaging the post from said plate when freed of said retaining means.

6. The combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said post having a diagonal lug, and said plate having one or more cut outs in its periphery to accommodate said lug, said post having a groove extending longitudinally thereof, a stud carried by the chaser-carrier and extending into said groove for retaining the post in its normal position, and means for disengaging the post from said plate when freed of said stud.

7. The combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said post having a diagonal lug, and said plate having one or more cut-outs in its periphery to accommodate said lug, said post having a groove extending longitudinally thereof, a support for said post to which it is pivoted, a stud carried by the chaser-carrier and extending into said groove, and a spring for moving said post out of engagement with said plate when said stud is withdrawn from said groove.

8. In a tool for cutting tapered threads, the combination with a rotatable and longitudinally movable chaser-carrier, a series of radially arranged chasers, and a chaser-engaging plate rotatable with, and also relatively to, the chaser-carrier, of an element rotatable with the chaser-carrier but not partaking of the longitudinal travel thereof, such element engaging said chaser-engaging plate for automatically controlling the rotation thereof independently of the housing, and means for effecting a relative adjustment between the chaser-carrier and the chaser-engaging plate together with said element for changing the positions of the chasers.

9. In a tool for cutting tapered threads, the combination with a rotatable and longitudinally movable chaser-carrier, a series of radially arranged chasers, and a chaser-engaging plate rotatable with, and also relatively to, the chaser-carrier, of an element rotatable with the chaser-carrier but not partaking of the longitudinal travel thereof, such element engaging said chaser-engaging plate for automatically controlling the rotation thereof independently of the chaser-carrier, and means for adjusting such element and the chaser-engaging plate relatively to the chaser-carrier to change the positions of the chasers.

10. The combination with a chaser-carrier and series of radially-arranged chasers, and a chaser-engaging plate rotatable with, and also relatively to, the chaser-carrier, of an element rotatable with the chaser-carrier and between which and said chaser-carrier there is a relative longitudinal movement during the cutting operation, such element interlocking with said chaser-engaging plate for controlling the rotation thereof independently of the chaser-carrier, and means for adjusting such element relatively to the chaser-carrier while interlocked with said chaser-engaging plate for changing the positions of the chasers.

11. The combination with a chaser-carrier, a series of radially-arranged chasers, and a chaser-engaging plate rotatable with, and also relatively to, the chaser-carrier, said plate having a groove in its periphery, of a post, a support for said post rotatable with said chaser-carrier and between which latter and said post there is a relative longitudinal movement during the cutting operation, said post having a diagonal lug for engaging with said groove in said plate, and means carried by the chaser-carrier for simultaneously adjusting the position of said post and said plate relatively to the chaser-carrier to change the positions of the chasers.

12. The combination with a chaser-carrier, a series of radially-arranged chasers, and a chaser-engaging plate rotatable with, and also relatively to, the chaser-carrier, said plate having a groove in its periphery, of a post, a support for said post rotatable with said chaser-carrier and between which latter and said post there is a relative longitudinal movement during the cutting operation, said post having a diagonal lug for engaging with said groove in said plate, and being shiftable on said support, and means carried by the chaser-carrier for shifting the position of the post on its support and thereby turning the plate relatively to the chaser-carrier to change the positions of the chasers.

13. The combination with a chaser-carrier, a series of radially-arranged chasers, and a chaser-engaging plate rotatable with, and also relatively to, the chaser-carrier, said plate having a groove in its periphery, of a post, a support for said post rotatable with said chaser-carrier and between which latter and said post there is a relative longitudinal movement during the cutting operation, said post having a diagonal lug for engaging with said groove in said plate, and also having a longitudinal groove, a stud mounted in the chaser-carrier and extending into said longitudinal groove, and a set screw mounted in the housing for also engaging said post to change the position thereof on its support, and a spring for disengaging said post from said plate when said post is freed of said stud.

In testimony whereof, I have signed this specification in the presence of two subscribing witnesses.

BRADFORD BORDEN.

Witnesses:
D. S. TOVELL,
H. M. CHRISTMAN.

Copies of this patent may be obtained for five cents each, by addressing the "Commissioner of Patents, Washington, D. C."